(No Model.)

M. TIDD.
INSTRUMENT FOR MEASURING THICKNESS OF LEATHER.

No. 564,235. Patented July 21, 1896.

Witnesses
A. N. Bonney,
C. G. Graydon.

Inventor
Marshall Tidd
By his Att'y
Henry W. Williams

UNITED STATES PATENT OFFICE.

MARSHALL TIDD, OF WOBURN, MASSACHUSETTS, ASSIGNOR OF ONE-HALF TO JAMES ROBERTSON, OF SAME PLACE.

INSTRUMENT FOR MEASURING THICKNESS OF LEATHER.

SPECIFICATION forming part of Letters Patent No. 564,235, dated July 21, 1896.

Application filed December 10, 1895. Serial No. 571,659. (No model.)

*To all whom it may concern:*

Be it known that I, MARSHALL TIDD, a citizen of the United States, residing at Woburn, in the county of Middlesex and State of Massachusetts, have invented new and useful Improvements in Instruments for Measuring the Thickness of Leather, of which the following is a specification.

This is an instrument which is constructed and adapted especially for ascertaining the thickness of leather and for indicating the number of ounces to the square foot on a suitable scale. That is to say, a given thickness of leather when placed in my instrument will be indicated by said instrument as weighing a certain number of ounces to the square foot.

The invention consists in the novel construction and combination of parts hereinafter described, and illustrated in the accompanying drawings, whereby such an instrument is produced which is accurate, simple, not liable to get out of repair, economical, and capable of adapting itself to the inequalities in the surface of the leather.

Figure 1:
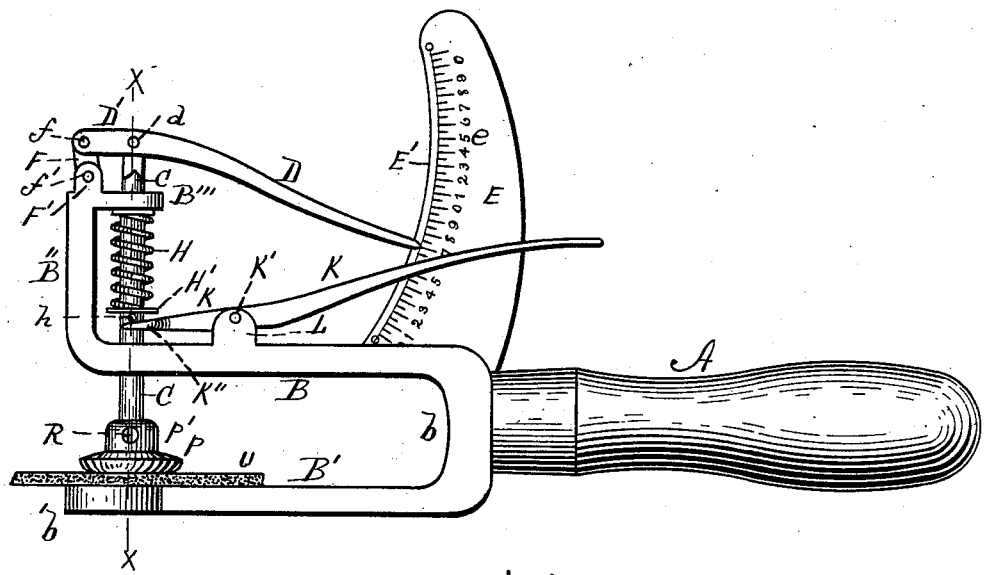
Figure 2:
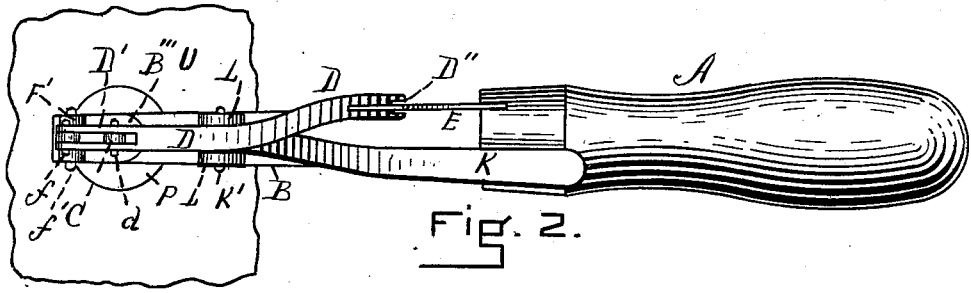
Figure 3:
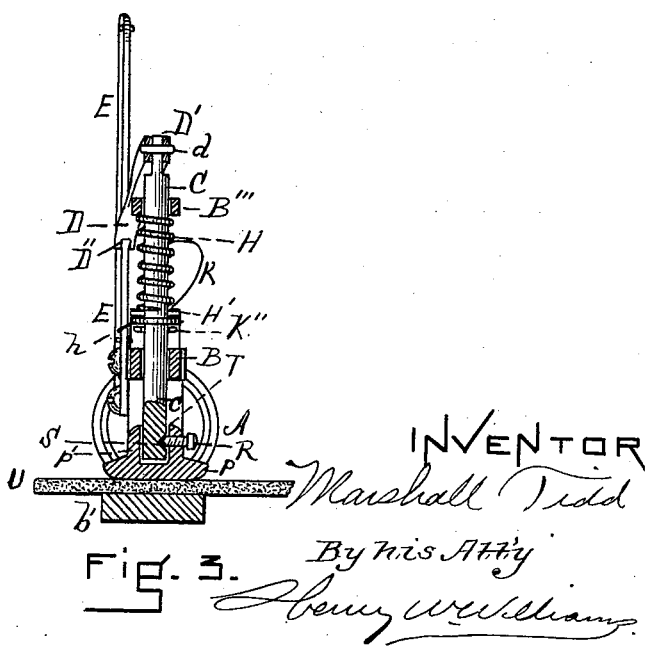

In the accompanying drawings, in which similar letters of reference indicate corresponding parts, Figure 1 is a side elevation of my improved instrument. Fig. 2 is a plan view of the same. Fig. 3 is a vertical section taken on line $x$, Fig. 1.

A is a handle secured to and extending horizontally from a frame which comprises the parallel horizontal portions B B' and the vertical or upright portion B'', from which last extends horizontally the vertically-perforated bracket or ear B'''. The inner ends of the portions B B' are united by the integral portion $b$. The outer end of the portion B' is preferably broadened, as shown at $b'$. The portion B of the frame is vertically perforated to receive the rod or plunger C, which extends up through the perforations in said portions B and B'''. The upper end of this plunger C is pivotally secured at $d$ to and within the bifurcated end D' of the lever D, which serves as a pointer, the end of its long arm being notched or bifurcated at D'', whereby it straddles the curved or arc-shaped edge E' of the indicating plate or dial E, which is secured at its lower end to the frame. The outer or short arm D' of the lever D is pivoted at $f$ to the link F, whose lower end is pivotally secured at $f'$ to the ears F' at the upper end of the portion B'' of the frame. A spiral spring H surrounds the plunger C and is confined between the portion B''' of the frame and a disk or ring H', supported on the rod or plunger C by the pin $h$. A lifting-lever K is pivoted at K' to the ears L on the portions B of the frame, the short arm of said lifting-lever being bifurcated at K'' to embrace the rod or plunger C and underlie the opposite ends of the pin $h$.

P is a foot-piece whose shank P' is secured to the lower end of the plunger C by a set-screw R, whose inner end extends into the recess S in one side of said rod C, said recess being, however, larger than the inner end of the set-screw and the bore T in said shank being greater in diameter than the said rod C, so that while the foot-piece P is secure in its position it is not rigid, but is allowed a certain amount of play or movement, so that it can accommodate itself to inequalities in the surface of the leather to be measured.

To measure the thickness of a piece of leather, as U, press down the lever K, thus lifting the plunger C against the power of the spring H, insert the leather within the frame upon the portion $b'$, and release the lever K, and said spring will hold the foot-piece P down upon the surface of the leather U. As the pointer-lever D is operated by the plunger C, its outer end will be held up from its lowest point by the said piece of leather. The plate E is provided (preferably on both sides) with a scale $e$, which indicates ounces to a square foot of leather.

When the instrument is in the position shown in the drawings, the scale $e$ indicates that the piece of leather being measured is of such a thickness that it will weigh seven ounces to the square foot. Of course a thicker piece of leather will raise the pointer D, while the removal of the leather U entirely will cause the pointer to embrace the edge E' at the lowest mark of the scale, viz., at zero.

Having thus fully described my invention, what I claim, and desire to secure by Letters Patent, is—

1. In an instrument for measuring leather, the combination of the frame consisting of the horizontal, parallel bars B B', set one above the other, the vertical portion *b* uniting the rear ends of said bars and the vertical portion B" extending up from the upper bar B and provided with the rearwardly-extending horizontal bracket or ear B""; the vertically-reciprocating rod or plunger C extending through said portions B and B"', a foot-piece secured to the lower end of said rod or plunger; a spring connected with said rod and adapted to hold it normally down with the foot-piece upon the lower portion B' of the frame; the vertical indicating-plate E extending up from the frame and provided with a curved scale; the pointer D pivotally connected at one end with the upright portion B" of the frame, extending to the scale and pivoted intermediate of its ends to the upper end of the rod or plunger C, and the lifting-lever K pivoted to the frame and adapted to raise said rod or plunger against the power of the spring, substantially as described.

2. The herein-described improved instrument for measuring leather, comprising the frame B B' *b*, the vertically-reciprocating rod or plunger C supported by and playing in said frame, a lifting-lever adapted to raise said rod or plunger and by releasing it to allow it to drop upon the leather to be measured, a plate or dial supported by the frame and provided with a suitable scale, a pointer extending to said scale and actuated in its movement by said rod or plunger, and the foot-piece P whose shank P' embraces the lower end of said rod or plunger and is provided with a bore larger in diameter than the diameter of said rod, said shank being closely connected with said rod whereby it is afforded sufficient play thereon to accommodate itself to the inequalities of the leather which is being measured, substantially as set forth.

MARSHALL TIDD.

Witnesses:
HENRY W. WILLIAMS,
C. G. GRAYDON.